(12) United States Patent
Nakao et al.

(10) Patent No.: US 11,456,624 B2
(45) Date of Patent: Sep. 27, 2022

(54) NON-CONTACT POWER FEEDING DEVICE

(71) Applicant: OMRON Corporation, Kyoto (JP)

(72) Inventors: Goro Nakao, Inazawa (JP); Kenichi Tabata, Ichinomiya (JP); Yusuke Kawai, Ichinomiya (JP); Atsushi Nomura, Ichinomiya (JP); Takahiro Takeyama, Ichinomiya (JP); Masanobu Nakajo, Nagoya (JP)

(73) Assignee: OMRON OORPORATION, Kyoto (JP)

(*) Notice: Subject to any disclaimer, the term of this patent is extended or adjusted under 35 U.S.C. 154(b) by 0 days.

(21) Appl. No.: 17/286,501

(22) PCT Filed: Oct. 18, 2019

(86) PCT No.: PCT/JP2019/041206
§ 371 (c)(1),
(2) Date: Apr. 19, 2021

(87) PCT Pub. No.: WO2020/090534
PCT Pub. Date: May 7, 2020

(65) Prior Publication Data
US 2021/0344229 A1 Nov. 4, 2021

(30) Foreign Application Priority Data
Nov. 1, 2018 (JP) .............. JP2018-206942

(51) Int. Cl.
H02J 50/12 (2016.01)
H02J 50/80 (2016.01)
H02J 50/40 (2016.01)

(52) U.S. Cl.
CPC .............. *H02J 50/12* (2016.02); *H02J 50/40* (2016.02); *H02J 50/80* (2016.02)

(58) Field of Classification Search
CPC combination set(s) only.
See application file for complete search history.

(56) References Cited

U.S. PATENT DOCUMENTS 5,701,121 A * 12/1997 Murdoch ............. H04B 5/0081
340/870.31
6,483,202 B1 * 11/2002 Boys ................. H02J 50/12
307/17

(Continued)

FOREIGN PATENT DOCUMENTS

JP 2007-53861 A 3/2007
JP 2008-234523 A 10/2008

(Continued)

OTHER PUBLICATIONS

English translation of the International Search Report ("ISR") of PCT/JP2019/041206 dated Nov. 26, 2019.
Written Opinion("WO") of PCT/JP2019/041206 dated Nov. 26, 2019.

*Primary Examiner* — Rexford N Barnie
*Assistant Examiner* — Brian K Baxter
(74) *Attorney, Agent, or Firm* — Metrolex IP Law Group, PLLC

(57) ABSTRACT

A power reception device of a non-contact power feeding device has: a resonant circuit having a reception coil configured to receive electric power from a power transmission device and a resonant capacitor connected in series with the reception coil; a first rectifier circuit configured to rectify electric power received via the resonant circuit; a smoothing capacitor connected to the first rectifier circuit and configured to smooth a voltage outputted from the first rectifier circuit; a sub-coil arranged to be capable of being electromagnetically coupled to the reception coil; and a second rectifier circuit connected between the sub-coil and the smoothing capacitor, and configured to output electric power (Continued)

according to a voltage generated in the sub-coil to the smoothing capacitor in response to a voltage obtained by rectifying a voltage generated in the sub-coil being higher than a voltage between both terminals of the smoothing capacitor.

1 Claim, 9 Drawing Sheets

(56) References Cited

U.S. PATENT DOCUMENTS

| | | | | |
|---|---|---|---|---|
| 6,750,560 B1* | 6/2004 | Nishimoto | | H02J 7/00034 |
| | | | | 307/1 |
| 10,218,226 B2* | 2/2019 | Uchida | | H02J 7/025 |
| 2008/0116847 A1* | 5/2008 | Loke | | H02J 50/70 |
| | | | | 320/108 |
| 2009/0067207 A1* | 3/2009 | Nishino | | B60L 5/005 |
| | | | | 363/126 |
| 2010/0164295 A1* | 7/2010 | Ichikawa | | H02J 50/12 |
| | | | | 307/104 |
| 2012/0313448 A1* | 12/2012 | Anttila | | H02J 7/00036 |
| | | | | 307/104 |
| 2012/0319479 A1* | 12/2012 | Covic | | H02J 50/40 |
| | | | | 307/31 |
| 2012/0326522 A1* | 12/2012 | Fukushima | | B60L 53/12 |
| | | | | 307/104 |
| 2013/0241303 A1* | 9/2013 | Bae | | H02J 5/005 |
| | | | | 307/104 |
| 2013/0300210 A1* | 11/2013 | Hosotani | | H01F 38/14 |
| | | | | 307/104 |
| 2014/0266031 A1* | 9/2014 | Sasaki | | H02J 50/10 |
| | | | | 320/108 |
| 2015/0130290 A1* | 5/2015 | Park | | H02J 50/12 |
| | | | | 307/104 |
| 2015/0280455 A1* | 10/2015 | Bosshard | | B60L 53/126 |
| | | | | 307/104 |
| 2015/0311706 A1* | 10/2015 | Noguchi | | H02J 7/025 |
| | | | | 307/52 |
| 2017/0005525 A1* | 1/2017 | Lecias, Jr. | | H02J 7/00034 |
| 2017/0063161 A1 | 3/2017 | Sugiyama et al. | | |
| 2017/0077738 A1* | 3/2017 | Park | | H01F 27/36 |
| 2017/0098965 A1* | 4/2017 | Kikuchi | | H02J 50/50 |
| 2017/0256989 A1 | 9/2017 | Yoshii | | |
| 2018/0090995 A1* | 3/2018 | Arasaki | | B60L 53/122 |
| 2018/0212469 A1* | 7/2018 | Liu | | H02J 50/40 |
| 2019/0305600 A1* | 10/2019 | Nakao | | H02J 50/40 |
| 2019/0305613 A1* | 10/2019 | Oshima | | H02J 50/90 |
| 2020/0412172 A1* | 12/2020 | Nakao | | H02J 50/12 |
| 2021/0066966 A1* | 3/2021 | Nomura | | H02J 50/80 |

FOREIGN PATENT DOCUMENTS

| | | |
|---|---|---|
| JP | 2011-176914 A | 9/2011 |
| JP | 2013-243890 A | 12/2013 |
| JP | 2015-65724 A | 4/2015 |
| JP | 2015-149803 A | 8/2015 |
| JP | 2016-25719 A | 2/2016 |
| JP | 2017-46521 A | 3/2017 |
| JP | 2017-158012 A | 9/2017 |

* cited by examiner

NON-CONTACT POWER FEEDING DEVICE

TECHNICAL FIELD

The present invention relates to a non-contact power feeding device.

BACKGROUND ART

Conventionally, there has been studied so-called non-contact power feeding (also called wireless power feeding) technology, in which electric power is transmitted through space without using a metal contact point or the like.

In a power feeding device using non-contact power supply technology (hereinafter, simply referred to as a non-contact power feeding device), when a positional relationship between a coil on a primary side (a power transmission side) and a coil on a secondary side (a power reception side) fluctuates, a coupling degree between the two coils changes. As a result, an output voltage from a device of the power reception side to a load circuit also fluctuates. In some cases, the output voltage to the load circuit may rise excessively, causing a failure in the device on the power reception side or the load circuit. Therefore, a technique for suppressing an excessive increase in the output voltage has been proposed (see, for example, Patent Documents 1 and 2).

For example, Patent Document 1 proposes providing a resonance suppression circuit including a control coil that is magnetically coupled to a power receiving resonance coil on a power reception side, and monitoring an output voltage to suppress a resonance operation by a method of short-circuiting and opening the control coil with a switch. Further, Patent Document 2 proposes a technique of dividing a primary coil on a power feeding side into a plurality of partial coils, dividing a series capacitor connected in series with the primary coil into a plurality of series partial capacitors, and alternately connecting the primary partial coil and the series partial capacitor in series, to lower a voltage between terminals of the primary coil as compared with a case of without the division.

Patent Document 1: Japanese Unexamined Patent Publication No. 2015-65724 Patent Document 2: Japanese Unexamined Patent Publication No. 2011-176914

SUMMARY

However, in the technique disclosed in Patent Document 1, a resonant circuit on the power reception side has a capacitor connected in parallel with the power receiving resonance coil, and resonates in parallel with a current flowing through a coil on a power transmission side. It is known that, when the resonant circuit on the power reception side resonates in parallel, an output impedance for obtaining high efficiency increases, and setting a large output voltage is required for obtaining high efficiency. In addition, in this technique, a conduction angle of a current flowing through a diode of a rectifier circuit on the power reception side is narrowed, which results in reducing a power factor on the power reception side and inducing harmonic noise.

Further, in the technique disclosed in Patent Document 2, since a generated voltage itself is not suppressed, a total voltage applied to capacitors on a power transmission side and a power reception side becomes large. Therefore, it is required to use capacitors having a high withstand voltage as the capacitors on the power transmission side and the power reception side. Further, since a plurality of capacitors and a plurality of coils are alternately connected in series on the power transmission side, an increase in size of the circuit on the power transmission side is inevitable.

A non-contact power feeding device according to one or more embodiments may be capable of suppressing an excessive increase in a voltage generated in a resonant circuit of a device on a power reception side.

A non-contact power feeding device according to one or more embodiments may include a power transmission device and a power reception device to which electric power is transmitted from the power transmission device in a non-contact manner. In this non-contact power feeding device, the power transmission device may include a transmission coil configured to supply electric power to the power reception device, and a power supply circuit configured to supply AC power to the transmission coil. The power reception device may include a resonant circuit having a reception coil configured to receive electric power from the power transmission device, and a resonant capacitor connected in series with the reception coil; a first rectifier circuit configured to rectify electric power received via the resonant circuit; a smoothing capacitor connected to the first rectifier circuit and configured to smooth a voltage outputted from the first rectifier circuit; a sub-coil arranged to be capable of being electromagnetically coupled to the reception coil; and a second rectifier circuit connected between the sub-coil and the smoothing capacitor, and configured to output electric power according to a voltage generated in the sub-coil to the smoothing capacitor, in response to a first voltage obtained by rectifying a voltage generated in the sub-coil being higher than a voltage between both terminals of the smoothing capacitor.

By having such a configuration, a non-contact power feeding device according to one or more embodiments may suppress an excessive increase in a voltage generated in the resonant circuit of the device on the power reception side.

In this non-contact power feeding device, it may be preferable that the power reception device further has a Zener diode connected between the second rectifier circuit and the smoothing capacitor and reversely biased with respect to the first voltage.

This may allow the non-contact power feeding device to prevent an excessive increase in a voltage generated in the resonant circuit, while suppressing a decrease in power transmission efficiency when the non-contact power feeding device performs a constant voltage output operation, even when the number of turns of the reception coil is small.

Alternatively, in this non-contact power feeding device, it may be preferable that the power reception device further has a Zener diode connected between the sub-coil and the second rectifier circuit and reversely biased with respect to a voltage generated in the sub-coil.

This may allow the non-contact power feeding device to prevent an excessive increase in a voltage generated in the resonant circuit, while suppressing a decrease in power transmission efficiency when the non-contact power feeding device performs a constant voltage output operation, even when the number of turns of the reception coil is small.

In addition, in this non-contact power feeding device, it may be preferable that the power reception device further has: a first switch circuit connected to the sub-coil and configured to switch between short-circuiting and opening of the sub-coil; a voltage detection circuit configured to measure an output voltage from the smoothing capacitor to obtain a measured value of the output voltage; and a determination circuit configured to control the first switch circuit so as to short-circuit the sub-coil when a measured value of the output voltage reaches equal to or larger than a first upper-limit threshold value.

This may allow the non-contact power feeding device to suppress an excessive increase in the output voltage due to a fluctuation in a coupling degree between the transmission coil and the reception coil, and prevent a failure of the power reception device and the load circuit connected to the power reception device.

In this case, it may be preferable that the power reception device further has a second switch circuit having a first end connected between the resonant capacitor and the first rectifier circuit, and a second end connected to a terminal that is not connected to the resonant capacitor of the reception coil, and the second switch circuit is configured to switch between short-circuiting and opening of the resonant circuit. Further, it may be preferable that the determination circuit controls the second switch circuit so as to short-circuit the resonant circuit when a measured value of the output voltage reaches equal to or larger than a second upper-limit threshold value that is larger than the first upper-limit threshold value.

This may allow the non-contact power feeding device to suppress an excessive increase in the output voltage due to a fluctuation in a coupling degree between the transmission coil and the reception coil even when a ratio of the number of turns of the reception coil to the number of turns of the sub-coil is large, and prevent a failure of the power reception device and the load circuit connected to the power reception device. Further, the non-contact power feeding device may prevent a flow of an excessive short-circuit current in the resonant circuit.

A non-contact power feeding device according to one or more embodiments may include a power transmission device and a power reception device to which electric power is transmitted from the power transmission device in a non-contact manner. In this non-contact power feeding device, the power transmission device may include a transmission coil configured to supply electric power to the power reception device, and a power supply circuit configured to supply AC power to the transmission coil. Then, the power reception device may include a reception coil configured to receive electric power from the power transmission device; a resonant circuit having a resonant capacitor connected in series with the reception coil; a sub-coil arranged to be capable of being electromagnetically coupled to the reception coil; and a saturable reactor connected to the sub-coil and having an inductance that decreases in response to a voltage generated in the sub-coil exceeding a predetermined voltage value.

By having such a configuration, the non-contact power feeding device according to one or more embodiments may suppress an excessive increase in a voltage generated in the resonant circuit of the device on the power reception side.

DETAILED DESCRIPTION

Hereinafter, a non-contact power feeding device according to one or more embodiments are described with reference to the drawings. In this non-contact power feeding device, a device on a power reception side is provided together with a reception coil, which is included in a resonant circuit for power reception and connected in series with a capacitor, to be capable of being electromagnetically coupled to the reception coil. Further, the device on the power reception side has a sub-coil having a number of turns smaller than the number of turns of the reception coil. Then, both terminals of the sub-coil are connected to a rectifier circuit, and both terminals of the rectifier circuit are respectively connected to both terminals of a smoothing capacitor configured to smooth an output voltage from the resonant circuit. This allows the non-contact power feeding device to prevent application of an excessive voltage to the resonant circuit with a current flowing from the sub-coil to the smoothing capacitor via the rectifier circuit, even when starting power supply in a state where AC power is supplied having a frequency that matches a resonance frequency of the resonant circuit of the device on the power reception side, to the transmission coil.

Figure 1:
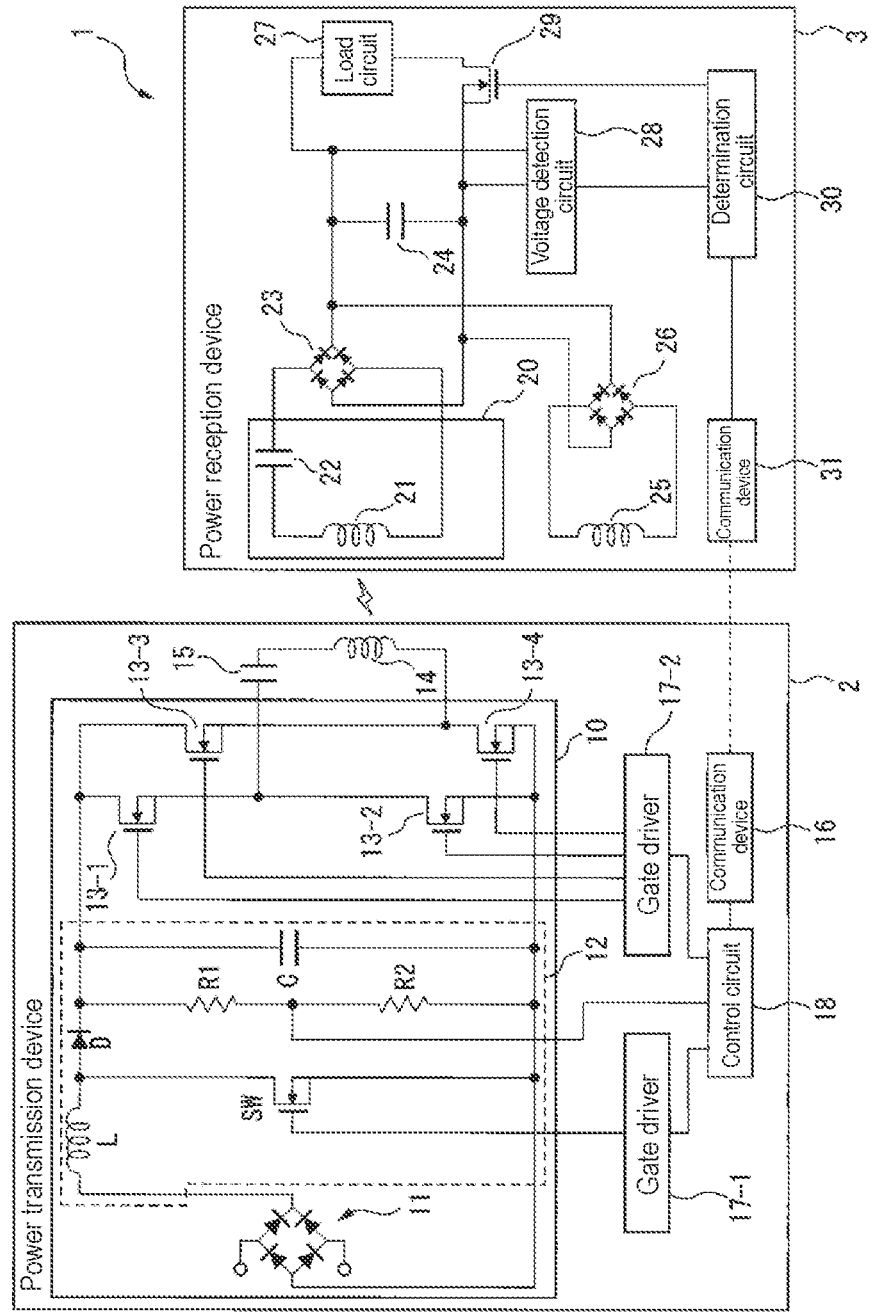
FIG. 1 is a schematic configuration diagram illustrating a non-contact power feeding device according to one or more embodiments.

FIG. 1 is a schematic configuration diagram of a non-contact power feeding device according to one or more embodiments are. As shown in FIG. 1, a non-contact power feeding device 1 has a power transmission device 2, and a power reception device 3 to which electric power is transmitted from the power transmission device 2 in a non-contact manner via space. The power transmission device 2 has a power supply circuit 10, a transmission coil 14, a capacitor 15, a communication device 16, gate drivers 17-1 and 17-2, and a control circuit 18. Whereas, the power reception device 3 has: a resonant circuit 20 having a reception coil 21 and a resonant capacitor 22; a first rectifier circuit 23; a smoothing capacitor 24; a sub-coil 25; a second rectifier circuit 26; a load circuit 27; a voltage detection circuit 28; a switching element 29; a determination circuit 30; and a communication device 31. The non-contact power feeding device 1 does not utilize resonance on the power transmission side, but can perform a constant voltage output operation since the non-contact power feeding device 1 has a configuration similar to that of a so-called primary series secondary series capacitor system (hereinafter referred to as an SS system).

First, the power transmission device 2 will be described.

The power supply circuit 10 supplies AC power having an adjustable switching frequency and an adjustable voltage, to the transmission coil 14. For this purpose, the power supply circuit 10 includes a power source 11, a power-factor improving circuit 12, and four switching elements 13-1 to 13-4.

The power source 11 supplies electric power having a predetermined pulsating voltage. For this purpose, the power source 11 is connected to a commercial AC power source, and has a full-wave rectifier circuit for rectification of AC power supplied from the AC power source.

The power-factor improving circuit 12 converts a voltage of electric power outputted from the power source 11 into a voltage according to control from the control circuit 18, and outputs the voltage. For this purpose, the power-factor improving circuit 12 has, for example: a coil L and a diode D that are sequentially connected in series from a positive electrode side terminal of the power source 11; a switching element SW that is an n-channel MOSFET in which a drain terminal is connected between the coil L and the diode D and a source terminal is connected to a negative electrode side terminal of the power source 11; and a smoothing capacitor C that is connected in parallel with the switching element SW with the diode D interposed in between. Further, a gate terminal of the switching element SW is connected to the gate driver 17-1. Moreover, the power-factor improving circuit 12 has two resistors R1 and R2 connected in series between the positive electrode side terminal and the negative electrode side terminal of the power source 11. The resistors R1 and R2 are connected in parallel with the smoothing capacitor C, between the diode D and the smoothing capacitor C. Then, a voltage between the resistor R1 and the resistor R2 is measured by the control circuit 18 as representing a voltage outputted from the diode D.

By the gate driver 17-1 controlling on/off of the switching element SW in accordance with a duty ratio instructed by the control circuit 18 such that a locus of a current waveform outputted from the diode D matches a locus of a voltage supplied from the power source 11, the power-factor improving circuit 12 executes a power factor improving operation. Then, as the duty ratio at which the switching element SW is turned on is higher, the voltage outputted from the diode D becomes higher.

The voltage outputted from the diode D is smoothed by the smoothing capacitor C, and supplied to the transmission coil 14 via four switching elements 13-1 to 13-4.

Note that the power-factor improving circuit 12 is not limited to the above configuration, and may have another configuration in which the output voltage can be adjusted by control from the control circuit 18.

The four switching elements 13-1 to 13-4 can be, for example, n-channel MOSFETs. Then, among the four switching elements 13-1 to 13-4, the switching element 13-1 and the switching element 13-2 are connected in series between the positive electrode side terminal and the negative electrode side terminal of the power source 11 via the power-factor improving circuit 12. Further, in the embodiment, the switching element 13-1 is connected to the positive electrode side of the power source 11, while the switching element 13-2 is connected to the negative electrode side of the power source 11. Then, a drain terminal of the switching element 13-1 is connected to the positive electrode side terminal of the power source 11 via the power-factor improving circuit 12, and a source terminal of the switching element 13-1 is connected to a drain terminal of the switching element 13-2. Further, a source terminal of the switching element 13-2 is connected to the negative electrode side terminal of the power source 11 via the power-factor improving circuit 12. Moreover, the source terminal of the switching element 13-1 and the drain terminal of the switching element 13-2 are connected to one end of the transmission coil 14 via the capacitor 15, and the source terminal of the switching element 13-2 is connected to another end of the transmission coil 14 via the switching element 13-4.

Similarly, among the four switching elements 13-1 to 13-4, the switching element 13-3 and the switching element 13-4 are connected in parallel with the switching element 13-1 and the switching element 13-2, and in series between the positive electrode side terminal and the negative electrode side terminal of the power source 11 via the power-factor improving circuit 12. Further, the switching element 13-3 is connected to the positive electrode side of the power source 11, while the switching element 13-4 is connected to the negative electrode side of the power source 11. Then, a drain terminal of the switching element 13-3 is connected to the positive electrode side terminal of the power source 11 via the power-factor improving circuit 12, and a source terminal of the switching element 13-3 is connected to a drain terminal of the switching element 13-4. Further, a source terminal of the switching element 13-4 is connected to the negative electrode side terminal of the power source 11 via the power-factor improving circuit 12. Moreover, the source terminal of the switching element 13-3 and the drain terminal of the switching element 13-4 are connected to another end of the transmission coil 14.

Further, the gate terminal of each of the switching elements 13-1 to 13-4 is connected to the control circuit 18 via the gate driver 17-2. Moreover, each gate terminal of each of the switching elements 13-1 to 13-4 may be connected to a source terminal of the own switching element via a resistor, in order to ensure that the switching element is turned on when a voltage to be turned on is applied. Then, each of the switching elements 13-1 to 13-4 is switched on/off at an adjustable switching frequency in accordance with a control signal from the control circuit 18. In the embodiment, a set of the switching element 13-1 and the switching element 13-4 and a set of the switching element 13-2 and the switching element 13-3 are alternately turned on/off such that the switching element 13-2 and the switching element 13-3 are turned off while the switching element 13-1 and the switching element 13-4 are turned on, and conversely, the switching element 13-1 and the switching element 13-4 are turned off while the switching element 13-2 and the switching element 13-3 are turned on. This causes DC power supplied from the power source 11 via the power-factor improving circuit 12 to be converted into AC power having a switching frequency of each of the switching elements, and supplied to the transmission coil 14.

Then, the transmission coil 14 transmits the AC power supplied from the power supply circuit 10 to the resonant circuit 20 of the power reception device 3 via space.

The capacitor 15 is connected in series with the transmission coil 14, and cuts off a DC current flowing through the transmission coil 14. Note that a capacitance of the capacitor 15 is preferably set such that a resonance frequency of the resonant circuit formed by the transmission coil 14 and the capacitor 15 is different from a frequency included in an adjustment range of a switching frequency of AC power supplied from the power supply circuit 10 to the transmission coil 14, that is, the resonant circuit formed by the transmission coil 14 and the capacitor 15 does not resonate with the AC power supplied from the power supply circuit 10 to the transmission coil 14. Further, the capacitor 15 may be omitted.

Every time the communication device 16 receives a radio signal from the communication device 31 of the power reception device 3, the communication device 16 extracts, from the radio signal, determination information indicating whether or not the non-contact power feeding device 1 is performing the constant voltage output operation, and outputs the determination information to the control circuit 18. For this purpose, the communication device 16 has: an antenna configured to receive a radio signal, for example, in accordance with a predetermined wireless communication standard; and a communication circuit configured to demodulate the radio signal. Note that the predetermined wireless communication standard can be, for example, ISO/IEC 15693, ZigBee (registered trademark), or Bluetooth (registered trademark).

The gate driver 17-1 receives, from the control circuit 18, a control signal for switching on/off of the switching element SW of the power-factor improving circuit 12, and changes a voltage to be applied to the gate terminal of the switching element SW in accordance with the control signal. That is, when the gate driver 17-1 receives a control signal for turning on the switching element SW, the gate driver 17-1 applies a relatively high voltage for turning on the switching element SW to the gate terminal of the switching element SW. Whereas, when the gate driver 17-1 receives a control signal for turning off the switching element SW, the gate driver 17-1 applies a relatively low voltage for turning off the switching element SW to the gate terminal of the switching element SW. This causes the gate driver 17-1 to switch on/off of the switching element SW of the power-factor improving circuit 12 at a timing instructed by the control circuit 18.

The gate driver 17-2 receives, from the control circuit 18, a control signal for switching on/off of each of the switching elements 13-1 to 13-4, and changes a voltage to be applied to the gate terminal of each of the switching elements 13-1 to 13-4 in accordance with the control signal. That is, when the gate driver 17-2 receives a control signal for turning on the switching element 13-1 and the switching element 13-4, the gate driver 17-2 applies a relatively high voltage for turning on the switching element 13-1 and the switching element 13-4 to the gate terminal of the switching element 13-1 and the gate terminal of the switching element 13-4. This causes a current from the power source 11 to flow through the switching element 13-1, the transmission coil 14, and the switching element 13-4. Whereas, when the gate driver 17-2 receives a control signal for turning off the switching element 13-1 and the switching element 13-4, the gate driver 17-2 applies a relatively low voltage to the gate terminal of the switching element 13-1 and the gate terminal of the switching element 13-4 such that the switching element 13-1 and the switching element 13-4 are turned off and a current from the power source 11 no longer flows through the switching element 13-1 and the switching element 13-4. The gate driver 17-2 also similarly controls a voltage applied to the gate terminal, for the switching element 13-2 and the switching element 13-3. Therefore, when the switching element 13-1 and the switching element 13-4 are turned off and the switching element 13-2 and the switching element 13-3 are turned on, the current from the power source 11 flows through the switching element 13-3, the transmission coil 14, and the switching element 13-2.

The control circuit 18 includes, for example, a non-volatile memory circuit, a volatile memory circuit, an arithmetic circuit, and an interface circuit for connection to another circuit. Then, when the control circuit 18 receives abnormal voltage generation information from the communication device 16, the control circuit 18 starts controlling a switching frequency and a voltage of AC power supplied from the power supply circuit 10 to the transmission coil 14. After that, every time the control circuit 18 receives determination information from the communication device 16, the control circuit 18 controls the switching frequency and the voltage of the AC power supplied from the power supply circuit 10 to the transmission coil 14 in accordance with the determination information.

For this purpose, in the embodiment, the control circuit 18 controls each of the switching elements 13-1 to 13-4 such that the set of the switching element 13-1 and the switching element 13-4 and the set of the switching element 13-2 and the switching element 13-3 are turned on alternately, and a period during which the set of the switching element 13-1 and the switching element 13-4 is turned on within one cycle corresponding to the switching frequency is equal to a period during which the set of the switching element 13-2 and the switching element 13-3 is turned on. Note that, when switching on/off of the set of the switching element 13-1 and the switching element 13-4 and the set of the switching element 13-2 and the switching element 13-3, the control circuit 18 may have a dead time in which both sets of the switching elements are turned off, in order to prevent short-circuit of the power source 11 due to simultaneous turning on of the set of the switching element 13-1 and the switching element 13-4 and the set of the switching element 13-2 and the switching element 13-3.

In addition, the control circuit 18 selects a duty ratio according to a switching frequency, by referring to a reference table indicating a relationship between a switching frequency and a duty ratio achieving constant voltage output at that switching frequency and corresponding to an applied voltage to the transmission coil 14, for on/off control of the switching element SW of the power-factor improving circuit 12. Then, the control circuit 18 determines a timing for switching on/off of the switching element SW in accordance with the duty ratio and a change in an output voltage from the diode D of the power-factor improving circuit 12, and outputs a control signal indicating the timing to the gate driver 17-1.

Further, in a case where the communication device 16 cannot receive a radio signal from the power reception device 3, it is assumed that the power reception device 3 does not exist at a position where electric power can be supplied from the power transmission device 2, that is, the power transmission device 2 is in a standby state. Therefore, in this case, the control circuit 18 may set the duty ratio for on/off control of the switching element SW to a minimum value that can be set. This causes a voltage applied to the transmission coil 14 to become a minimum value that can be set as well while the power transmission device 2 is in the standby state, so that energy loss is suppressed.

Note that details of the control of the switching frequency and the voltage applied to the transmission coil 14 by the control circuit 18 will be described later.

Next, the power reception device 3 will be described.

The resonant circuit 20 is an LC resonant circuit including the reception coil 21 and the resonant capacitor 22 connected in series with each other. Then, one end of the reception coil 21 of the resonant circuit 20 is connected to one input terminal of the first rectifier circuit 23 via the resonant capacitor 22. Further, another end of the reception coil 21 is connected to another input terminal of the first rectifier circuit 23.

The reception coil 21 receives electric power from the transmission coil 14 by resonating with an AC current flowing through the transmission coil 14 of the power transmission device 2 together with the resonant capacitor 22. Then, the reception coil 21 outputs the received electric power to the first rectifier circuit 23 via the resonant capacitor 22. Note that the number of turns of the reception coil 21 and the number of turns of the transmission coil 14 of the power transmission device 2 may be the same or different.

The resonant capacitor 22 is connected in series with the reception coil 21. That is, the resonant capacitor 22 is connected at one end to one end of the reception coil 21, and connected to the first rectifier circuit 23 at another end. Then, the resonant capacitor 22 resonates with the reception coil 21 to output the received electric power to the first rectifier circuit 23.

The first rectifier circuit 23 can be, for example, a full-wave rectifier circuit having four bridge-connected diodes. One of the two terminals on an input side of the first rectifier circuit 23 is connected to the resonant capacitor 22, and another one of the two terminals on the input side is connected to the reception coil 21. Further, one of two terminals on an output side of the first rectifier circuit 23 is connected to one end of the smoothing capacitor 24, and another one of the two terminals on the output side is connected to another end of the smoothing capacitor 24. Then, the first rectifier circuit 23 rectifies AC power outputted from the resonant circuit 20, and converts it into pulsating power.

The smoothing capacitor 24 smoothes the pulsating power outputted from the first rectifier circuit 23 or the second rectifier circuit 26, and converts it into DC power. Then, the smoothing capacitor 24 outputs the DC power to the load circuit 27. For this purpose, one end of the smoothing capacitor 24 is connected to one of the two terminals on the output side of the first rectifier circuit 23, one of two terminals on an output side of the second rectifier circuit 26, and one end of the load circuit 27. Further, another end of the smoothing capacitor 24 is connected to another one of the two terminals on the output side of the first rectifier circuit 23, another one of the two terminals on the output side of the second rectifier circuit 26, and another end of the load circuit 27.

The sub-coil 25 is provided to be capable of being electromagnetically coupled to the reception coil 21 of the resonant circuit 20. For example, the sub-coil 25 and the reception coil 21 are wound around the same core wire. Further, both ends of the sub-coil 25 are connected to two input terminals of the second rectifier circuit 26, respectively. Further, a number of turns $n_s$ of the sub-coil 25 is set such that the number of turns $n_s$ of the sub-coil 25 is smaller than a number of turns $n_m$ of the reception coil 21. Moreover, a ratio $(n_m/n_s)$ of the number of turns $n_m$ of the reception coil 21 to the number of turns $n_s$ of the sub-coil 25 is preferably set such that an expected voltage peak maximum value of the sub-coil 25 is equal to or less than an input voltage to the load circuit 27, which is set in accordance with specifications of the load circuit 27, that is, equal to or less than an output voltage from the smoothing capacitor 24 when the non-contact power feeding device 1 is executing the constant voltage output operation. As a result, for example, even in a case where AC power having a switching frequency at which the resonant circuit 20 resonates is supplied to the transmission coil 14 when the non-contact power feeding device 1 starts power transmission, a part of the transmitted electric power flows from the sub-coil 25 to the smoothing capacitor 24 via the second rectifier circuit 26. This suppresses an excessive voltage being applied to the resonant circuit 20. Whereas, as in a case where the non-contact power feeding device 1 continues the constant voltage output operation, in a case where a voltage of electric power outputted from the resonant circuit 20 to the load circuit 27 via the first rectifier circuit 23 and the smoothing capacitor 24 becomes certain magnitude, a voltage between both terminals of the smoothing capacitor 24 becomes higher than a voltage between the two output terminals of the second rectifier circuit 26 according to a voltage applied between both terminals of the sub-coil 25. Therefore, no current flows from the sub-coil 25 to the smoothing capacitor 24. Therefore, when the non-contact power feeding device 1 continues the constant voltage output operation, the sub-coil 25 does not affect the constant voltage output operation.

The second rectifier circuit 26 can be, for example, a full-wave rectifier circuit having four bridge-connected diodes. Note that the second rectifier circuit 26 may be a rectifier circuit of another type. One of the two terminals on an input side of the second rectifier circuit 26 is connected to one end of the sub-coil 25, and another one of the two terminals is connected to another end of the sub-coil 25. Further, one of the two terminals on the output side of the second rectifier circuit 26 is connected to one end of the smoothing capacitor 24, and another one of the two terminals on the output side is connected to another end of the smoothing capacitor 24. Then, when a voltage between the two terminals on the output side of the second rectifier circuit 26 is higher than a voltage between both terminals of the smoothing capacitor 24 according to a voltage applied between both terminals of the sub-coil 25, the second rectifier circuit 26 outputs electric power outputted from the sub-coil 25, to the smoothing capacitor 24.

The voltage detection circuit 28 measures an output voltage between both terminals of the smoothing capacitor 24 at a predetermined cycle. The output voltage between both terminals of the smoothing capacitor 24 is in one-to-one correspondence with an output voltage of the resonant circuit 20 except when a current flows from the sub-coil 25 to the smoothing capacitor 24, such as immediately after the non-contact power feeding device 1 starts supplying electric power. Therefore, a measured value of the output voltage between both terminals of the smoothing capacitor 24 is indirectly to be a measured value of the output voltage of the resonant circuit 20. The voltage detection circuit 28 can be, for example, any of various known voltage detection circuits capable of detecting a DC voltage. Then, the voltage detection circuit 28 outputs a voltage detection signal representing the measured value of the output voltage, to the determination circuit 30.

The switching element 29 is, for example, a MOSFET, and is connected between the smoothing capacitor 24 and the load circuit 27. When the switching element 29 is turned off, a current does not flow from the smoothing capacitor 24 to the load circuit 27. When the switching element 29 is turned on, a current flows from the smoothing capacitor 24 to the load circuit 27.

The determination circuit 30 determines whether or not the measured value of the output voltage received from the voltage detection circuit 28 is within an allowable voltage range when the constant voltage output operation is performed. Then, the determination circuit 30 notifies the communication device 31 of the determination result.

For this purpose, the determination circuit 30 has, for example: a memory circuit configured to store allowable voltage ranges; an arithmetic circuit configured to compare a measured value of an output voltage with each of the allowable voltage ranges; and a control circuit configured to control on/off of the switching element 29.

Further, the determination circuit 30 switches on/off of the switching element 29 at a predetermined cycle while the measured value of the output voltage is out of the allowable voltage range. This causes a change in a resistance value of the entire circuit including the load circuit 27 connected to the smoothing capacitor 24, in the predetermined cycle. Therefore, the determination circuit 30 can determine whether or not the non-contact power feeding device 1 is performing the constant voltage output operation by determining whether or not the measured value of the output voltage is substantially constant, while switching on/off of the switching element 29. Therefore, while the measured value of the output voltage remains substantially constant even when on/off of the switching element 29 is switched at a predetermined cycle, the determination circuit 30 notifies the communication device 31 that the non-contact power feeding device 1 is performing the constant voltage output operation.

In addition, when the measured value of the output voltage is substantially constant for a certain period longer than a predetermined cycle, the determination circuit 30 stops the on/off switching of the switching element 29 to maintain the on state. Then, the determination circuit 30 determines whether or not the measured value of the output voltage is within the allowable voltage range, and notifies the communication device 31 of the determination result.

At that time, when the measured value of the output voltage is within the allowable voltage range for a certain period longer than a predetermined cycle, the determination circuit 30 notifies the communication device 31 of a determination result indicating that the non-contact power feeding device 1 is performing the constant voltage output operation and the measured value of the output voltage is within the allowable voltage range.

Meanwhile, according to a modified example, the power reception device 3 may have a resistor connected to the smoothing capacitor 24 in parallel with the load circuit 27. In this case, the switching element 29 may be provided so as to be in series with the resistor and in parallel with the load circuit 27. In this case, the determination circuit 30 turns off the switching element 29 while the measured value of the output voltage is within the allowable voltage range. Whereas, when the measured value of the output voltage is out of the allowable voltage range, the determination circuit 30 may simply switch on/off of the switching element 29 at a predetermined cycle as in the above embodiment. According to this modified example, power supply to the load circuit 27 is continued even when the non-contact power feeding device 1 is not performing the constant voltage output operation.

In accordance with the determination result received from the determination circuit 30, the communication device 31 generates a radio signal containing determination information indicating whether or not the non-contact power feeding device 1 is performing the constant voltage output operation, and whether or not the measured value of the output voltage is within the allowable voltage range. Then, the communication device 31 transmits the radio signal to the communication device 16 of the power transmission device 2. For this purpose, the communication device 31 has, for example, a communication circuit configured to generate a radio signal in accordance with a predetermined wireless communication standard, and an antenna configured to output the radio signal. Note that, similarly to the communication device 16, the predetermined wireless communication standard can be, for example, ISO/IEC 15693, ZigBee (registered trademark), or Bluetooth (registered trademark).

Hereinafter, details of an operation of the non-contact power feeding device 1 will be described. First, suppression of an excessive voltage on the resonant circuit 20 will be described.

In a case of an RLC series resonant circuit in which a coil and a capacitor resonate in series, such as the resonant circuit 20 of the power reception device 3 in the embodiment, a Q value representing sharpness of a resonance peak in the resonant circuit is expressed by the following formula.

[Formula 1]

$$Q = \frac{1}{R}\sqrt{\frac{L}{C}} \qquad (1)$$

Here, R is a resistance value of a resonant circuit, C is a capacitance of the resonant circuit, and L is an inductance of the resonant circuit. Further, $\omega_0$ is an angular frequency corresponding to a frequency $f_0$ of a current flowing in the resonant circuit, and $\omega_0 = 2\pi f_0$ is satisfied. As is apparent from Formula (1), the Q value becomes larger as the resistance value R is smaller. Therefore, in a case where almost no electric charge is accumulated in the smoothing capacitor 24, such as when the non-contact power feeding device 1 starts a power feeding operation, an apparent resistance value of the circuit connected to the resonant circuit 20 becomes very small, and the Q value becomes very large. Therefore, without the sub-coil 25, an excessive voltage may be applied to the resonant circuit 20, if AC power having a frequency at which the resonant circuit 20 resonates is supplied to the transmission coil 14.

However, in the embodiment, since the sub-coil 25 is provided so as to be electromagnetically coupled to the reception coil 21, a voltage is generated in the sub-coil 25 according to a ratio of the number of turns of the reception coil 21 to the number of turns of the sub-coil 25, and according to a coupling degree between the reception coil 21 and the sub-coil 25. Therefore, when a voltage applied to the reception coil 21 rises, and a voltage between the two output terminals of the second rectifier circuit 26 (that is, an output voltage of the second rectifier circuit 26) according to a voltage consequently generated in the sub-coil 25 becomes higher than a voltage between both terminals of the smoothing capacitor 24, a current flows from the sub-coil 25 to the smoothing capacitor 24 via the second rectifier circuit 26. That is, electric power is outputted from the sub-coil 25 to the smoothing capacitor 24 via the second rectifier circuit 26. As a result, resonance of the resonant circuit 20 is suppressed, which suppresses an excessive increase in the voltage applied to the reception coil 21. Whereas, as in a case where the non-contact power feeding device 1 continues the constant voltage output operation, in a case where a voltage of electric power outputted from the resonant circuit 20 to the load circuit 27 via the first rectifier circuit 23 and the smoothing capacitor 24 becomes certain magnitude, a voltage between both terminals of the smoothing capacitor 24 becomes higher than a voltage between the two output terminals of the second rectifier circuit 26 according to a voltage applied between both terminals of the sub-coil 25. Therefore, no current flows from the sub-coil 25 to the smoothing capacitor 24. Therefore, when the non-contact power feeding device 1 continues the constant voltage output operation, the sub-coil 25 does not affect the constant voltage output operation.

Figure 2A:
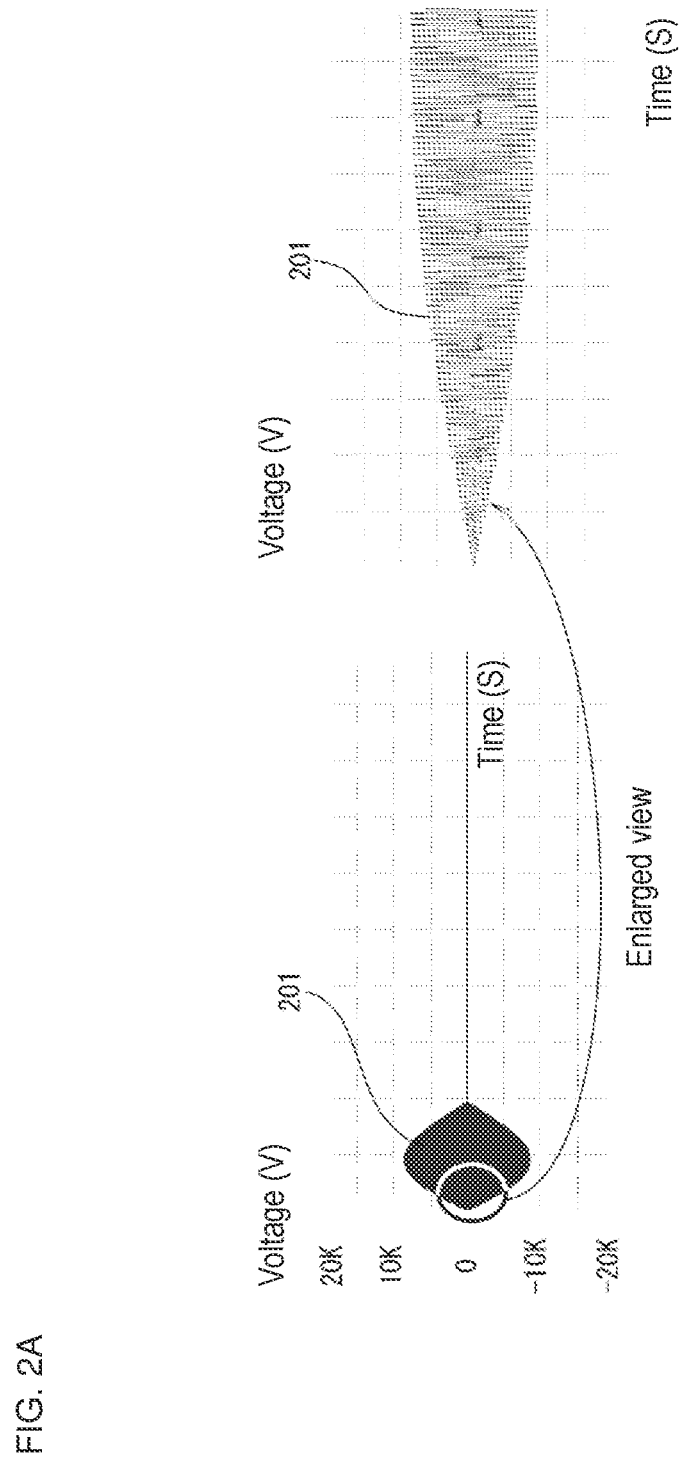
FIG. 2A is a diagram illustrating, as a comparative example, a simulation result of a time change of a voltage applied to a reception coil after a non-contact power feeding device starts a power supply operation in a case where there is no sub-coil.
Figure 2B:
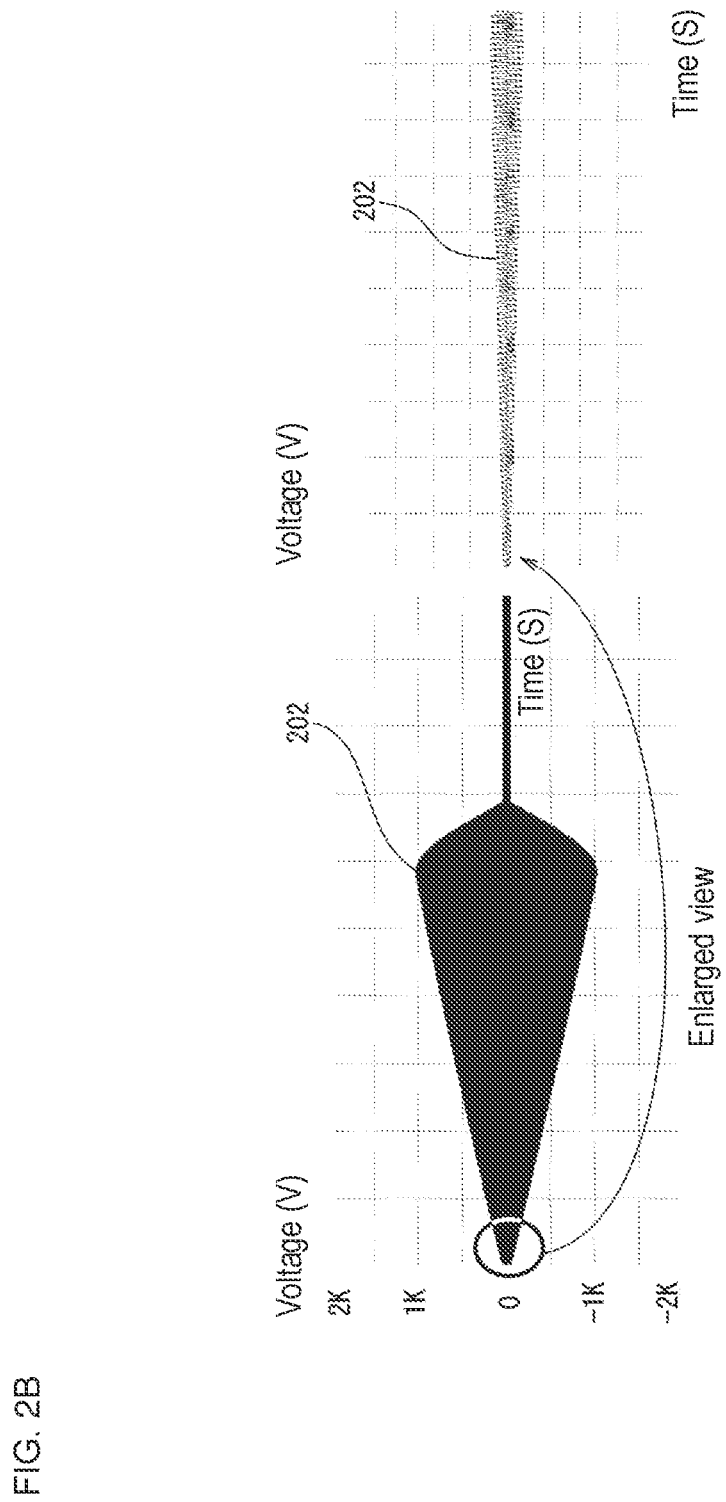
FIG. 2B is a diagram illustrating a simulation result of a time change of a voltage applied to a reception coil after a non-contact power feeding device according to an embodiment starts a power supply operation.

FIG. 2A is a view showing, as a comparative example, a simulation result of a time change of a voltage applied to the reception coil 21 after the non-contact power feeding device 1 starts a power supply operation in a case where there is no sub-coil 25. FIG. 2B is a view showing a simulation result of a time change of a voltage applied to the reception coil 21 after the non-contact power feeding device 1 according to the embodiment starts the power supply operation. Meanwhile, in this simulation, the number of turns of the transmission coil 14 was set to 16, an inductance of the transmission coil 14 was set to 70 µH, and a capacitance of the capacitor 15 was set to 0.4 µF. Further, the number of turns of the reception coil 21 was set to 30, an inductance of the reception coil 21 was set to 229 µH, a capacitance of the resonant capacitor 22 was set to 16.5 nF, and a coupling degree between the transmission coil 14 and the reception coil 21 was set to 0.41. Moreover, the number of turns of the sub-coil 25 was set to 2, an inductance of the sub-coil 25 was set to 1.1 µH, and a coupling degree between the reception coil 21 and the sub-coil 25 was set to 0.64. Further, a voltage outputted from the smoothing capacitor 24 to the load circuit 27 during the constant voltage output operation of the non-contact power feeding device 1 was set to 35V, and a current flowing through the load circuit 27 was set to 3.5 A. Then, a switching frequency of AC power supplied to the transmission coil 14 was set to 89.35 kHz.

In FIGS. 2A and 2B, a horizontal axis represents an elapsed time since the non-contact power feeding device 1 has started the power supply operation, and a vertical axis represents a voltage applied to the reception coil 21. Then, in FIG. 2A, a waveform 201 represents a time change of a voltage applied to the reception coil 21 in the comparative example. Further, in FIG. 2B, a waveform 202 represents a time change of a voltage applied to the reception coil 21 according to the embodiment. Comparing the waveform 201 and the waveform 202, it can be seen that providing the sub-coil 25 suppresses a maximum value of the voltage applied to the reception coil 21, and suppresses a sudden increase in the voltage applied to the reception coil 21.

Figure 3A:
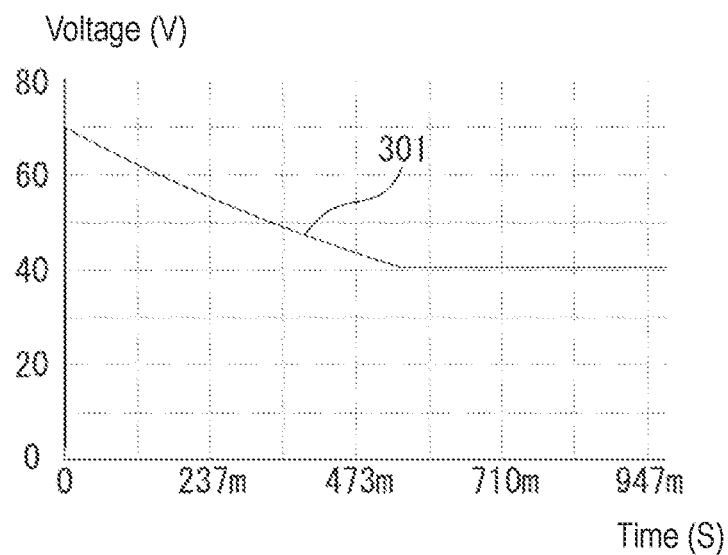
FIG. 3A is a graph illustrating, as a comparative example, a simulation result of a time change of a voltage outputted from a smoothing capacitor to a load circuit after a non-contact power feeding device starts a power supply operation in a case where there is no sub-coil.
Figure 3B:
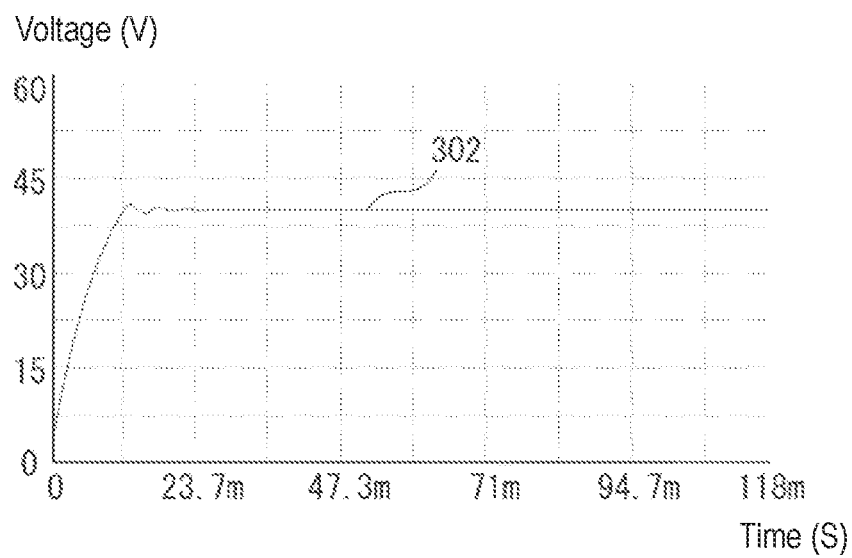
FIG. 3B is a graph illustrating a simulation result of a time change of a voltage outputted from a smoothing capacitor to a load circuit after a non-contact power feeding device according to an embodiment starts a power supply operation.

FIG. 3A is a graph showing, as a comparative example, a simulation result of a time change of a voltage outputted from the smoothing capacitor 24 to the load circuit 27 after the non-contact power feeding device 1 starts the power supply operation in a case where there is no sub-coil 25. FIG. 3B is a graph showing a simulation result of a time change of a voltage outputted from the smoothing capacitor 24 to the load circuit 27 after the non-contact power feeding device 1 according to the embodiment starts the power supply operation. In the simulations in FIGS. 3A and 3B, the same conditions as those shown in FIGS. 2A and 2B were applied.

In FIGS. 3A and 3B, a horizontal axis represents an elapsed time since the non-contact power feeding device 1 has started the power supply operation, and a vertical axis represents a voltage outputted from the smoothing capacitor 24 to the load circuit 27. Then, in FIG. 3A, a waveform 301 represents a time change of the voltage outputted from the smoothing capacitor 24 to the load circuit 27 in the comparative example. Further, in FIG. 3B, a waveform 302 represents a time change of a voltage outputted from the smoothing capacitor 24 to the load circuit 27 according to the embodiment. Comparing the waveform 301 and the waveform 302, it can be seen that providing the sub-coil 25 prevents an excessive voltage from being outputted to the load circuit 27, and shortens a time required for the voltage outputted from the smoothing capacitor 24 to the load circuit 27 to converge to a constant voltage.

Figure 4:
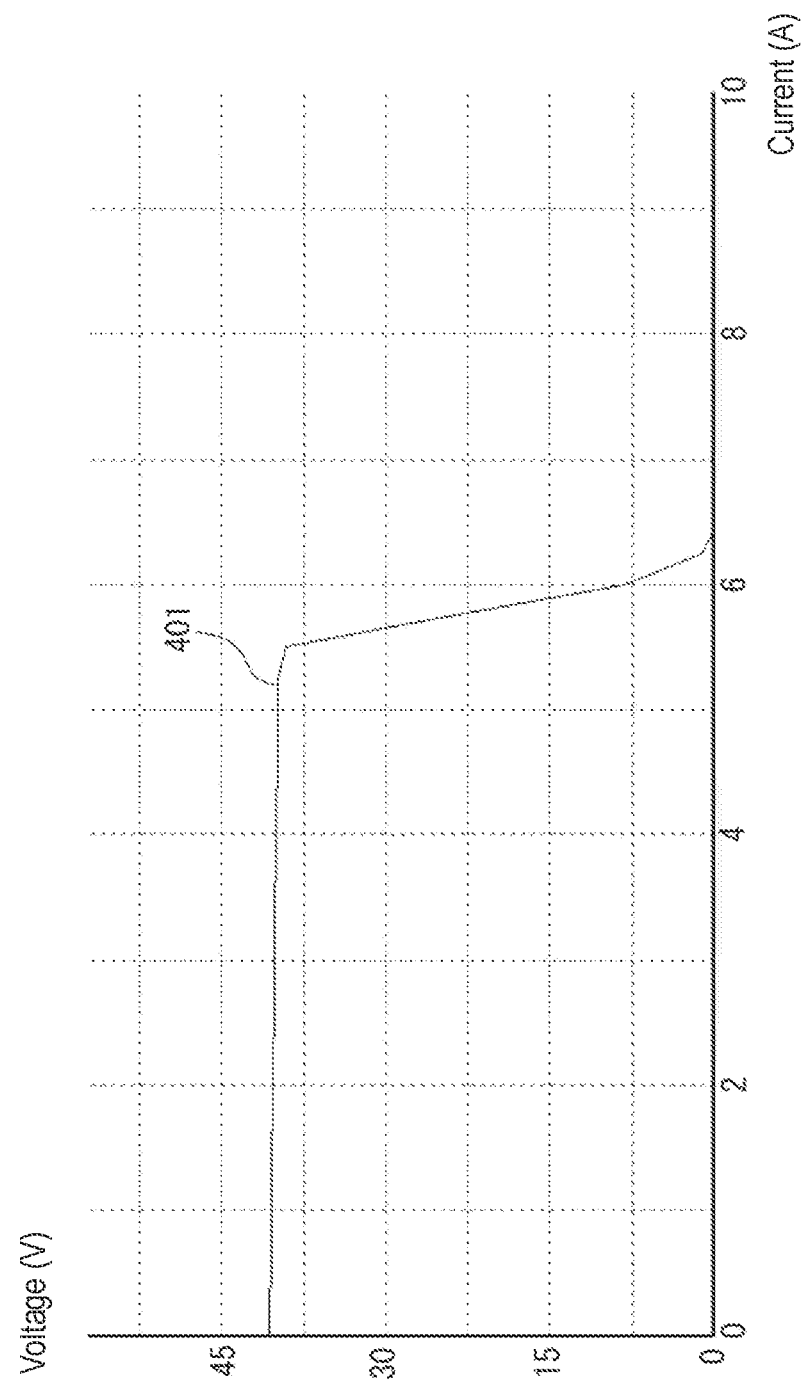
FIG. 4 is a graph illustrating a simulation result representing a drooping characteristic of a non-contact power feeding device according to one or more embodiments.

FIG. 4 is a graph showing a simulation result representing a drooping characteristic of the non-contact power feeding device 1 according to the embodiment. In the simulation in FIG. 4, the same conditions as those shown in FIGS. 2A and 2B were applied. In FIG. 4, a horizontal axis represents a current outputted from the smoothing capacitor 24 to the load circuit 27, and a vertical axis represents a voltage outputted from the smoothing capacitor 24 to the load circuit 27. Then, a waveform 401 represents a drooping characteristic of the non-contact power feeding device 1. As shown in the waveform 401, it can be seen that the voltage outputted from the smoothing capacitor 24 to the load circuit 27 drops sharply when the current outputted from the smoothing capacitor 24 to the load circuit 27 is increased to a certain level more. This has shown that the non-contact power feeding device 1 can protect against overcurrent by only the power reception device 3, without controlling AC power supplied to the transmission coil 14 in the power transmission device 2. Therefore, even if some kind of failure occurs in communication between the power transmission device 2 and the power reception device 3, the non-contact power feeding device 1 can prevent an excessive current from flowing through the load circuit 27.

Next, control for the non-contact power feeding device 1 to perform the constant voltage output operation will be described.

In the embodiment, when the control circuit 18 of the power transmission device 2 receives determination information indicating that a measured value of an output voltage is out of the allowable range from the communication device 16, the control circuit 18 starts adjustment of a switching frequency and a voltage of AC power supplied to the transmission coil 14, to allow the non-contact power feeding device 1 to perform the constant voltage output operation. Then, on the basis of the determination information received from the communication device 16, the control circuit 18 adjusts the switching frequency and the voltage of the AC power supplied from the power supply circuit 10 to the transmission coil 14 until the non-contact power feeding device 1 restarts the constant voltage output operation.

As described above, the non-contact power feeding device 1 according to the embodiment does not utilize resonance on the power transmission side, but has a configuration similar to that of the so-called SS system. Therefore, a frequency characteristic of an output voltage of the non-contact power feeding device 1 is similar to a frequency characteristic of an output voltage of a non-contact power feeding device of the SS system.

Then, the control circuit 18 controls the switching frequency and the voltage of the AC power applied to the transmission coil 14 as described below, in order to achieve the constant voltage output operation.

Upon receiving a notification indicating that a measured value of an output voltage is out of an allowable range from the communication device 16, the control circuit 18 changes the switching frequency of the AC power within a predetermined frequency domain. The predetermined frequency domain may be a frequency domain using, for example, as the lower limit, a frequency at which the constant voltage output is obtained at a minimum value of an expected coupling degree between the transmission coil 14 and the reception coil 21 when power is supplied from the power transmission device 2 to the power reception device 3, and using, as an upper limit, a frequency at which the constant voltage output is obtained at a maximum value of an expected coupling degree between the transmission coil 14 and the reception coil 21.

When changing the switching frequency, the control circuit 18 may increase the switching frequency sequentially from the lower limit to the upper limit of the predetermined frequency domain, or conversely, may lower the switching frequency sequentially from the upper limit to the lower limit of the predetermined frequency domain. At that time, the control circuit 18 preferably changes the switching frequency in steps such that the determination circuit 30 keeps the same switching frequency for a longer period than a cycle of switching on and off of the switching element 29, to allow the determination circuit 30 of the power reception device 3 to check whether or not the measured value of the output voltage is substantially constant.

In the determination information included in the radio signal received from the power reception device 3 via the communication device 16, when it is indicated that the measured value of the output voltage is not within the allowable voltage range but becomes substantially constant even if the resistance of the load circuit 27 changes, the control circuit 18 keeps the switching frequency constant after that. And then, the control circuit 18 determines the duty ratio by referring to a reference table showing a relationship between a switching frequency and a duty ratio achieving a constant voltage output regardless of a coupling degree at that switching frequency, for the on/off control of the switching element SW of the power-factor improving circuit 12. Then, the control circuit 18 controls the gate driver 17-1 so as to switch on/off of the switching element SW of the power-factor improving circuit 12 in accordance with the duty ratio. This causes the voltage applied to the transmission coil 14 to be adjusted such that an output voltage from the resonant circuit 20 is within the allowable voltage range, that is, a constant voltage is outputted regardless of the coupling degree. Then, when it is indicated that the measured value of the output voltage is within the allowable voltage range in the determination information included in the radio signal received from the power reception device 3 via the communication device 16, the control circuit 18 keeps the switching frequency and the voltage of the AC power supplied to the transmission coil 14 constant.

Note that, instead of referring to the reference table described above to determine the duty ratio, the control circuit 18 may gradually change the duty ratio until it is indicated that the measured value of the output voltage is within the allowable voltage range in the determination information included in the radio signal received from the power reception device 3 via the communication device 16.

Further, in order to improve the energy transmission efficiency, it is preferable that the power supply circuit 10 and the transmission coil 14 of the power transmission device 2 continuously perform a soft switching (inductive) operation. In order for the power supply circuit 10 and the transmission coil 14 to perform the soft switching operation, it is preferable that a phase of a current flowing through the transmission coil 14 is delayed from a phase of an applied voltage. This causes a current to flow from the source terminal to the drain terminal of the switching element 13-1, for example, when the switching element 13-1 and the switching element 13-4 are turned on. Therefore, the power supply circuit 10 and the transmission coil 14 perform the soft switching operation, which suppresses an occurrence of switching loss.

As described above, in this non-contact power feeding device, the sub-coil is provided to be electromagnetically coupled with the reception coil of the resonant circuit of the power reception device. Further, the sub-coil and the smoothing capacitor are connected via the rectifier circuit, to allow a voltage generated in the sub-coil to be rectified and allow the smoothing capacitor to output. This allows the non-contact power feeding device to prevent an excessive voltage from being applied to the resonant circuit of the power reception device, without controlling AC power supplied to the transmission coil on the power transmission side. Therefore, this non-contact power feeding device can continue the power supply operation while protecting against overvoltage in the power reception device. Moreover, this non-contact power feeding device can prevent an excessive current from flowing in the power reception device without depending on communication between the power transmission device and the power reception device.

Note that, it may not be possible to finely adjust a ratio of the number of turns $n_m$ of the reception coil 21 to the number of turns $n_s$ of the sub-coil 25 when the number of turns $n_m$ of the reception coil 21 is relatively small (for example, $n_m$<30). In such a case, a voltage generated in the sub-coil 25 fluctuates greatly with respect to a voltage applied to the reception coil 21, only by increasing or decreasing the number of turns $n_s$ of the sub-coil 25 by one turn. Therefore, when the number of turns $n_s$ of the sub-coil 25 is relatively large, an output voltage from the second rectifier circuit 26 according to a voltage generated in the sub-coil 25 may be higher than a voltage between both terminals of the smoothing capacitor 24 even in a case where the non-contact power feeding device 1 can perform the constant voltage output operation. As a result, a current flows from the sub-coil 25 to the smoothing capacitor 24 to suppress resonance of the resonant circuit 20, and power transmission efficiency is lowered. Whereas, the voltage applied to the reception coil 21, which allows a current to flow from the sub-coil 25 to the smoothing capacitor 24, rises significantly even by reducing the number of turns $n_s$ of the sub-coil 25 by one turn. Therefore, protection of the resonant circuit 20 against overvoltage may be insufficient.

Therefore, according to the modified example, by providing a Zener diode between the second rectifier circuit 26 and the smoothing capacitor 24, it is possible to make it difficult to output electric power from the sub-coil 25 to the smoothing capacitor 24 while the non-contact power feeding device 1 is performing the constant voltage output operation.

Figure 5:
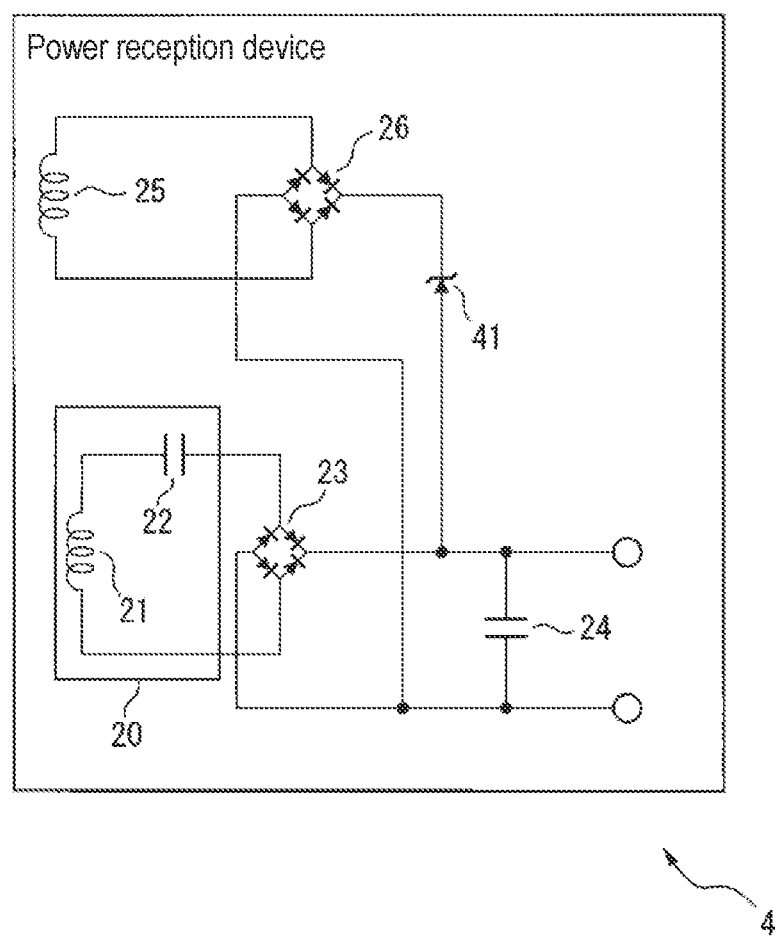
FIG. 5 is a schematic configuration diagram illustrating a power reception device according to a modified example.

FIG. 5 is a schematic configuration diagram of a power reception device according to this modified example. Note that, for the sake of simplicity, a load circuit 27, a voltage detection circuit 28, a switching element 29, a determination circuit 30, and a communication device 31 are not illustrated in FIG. 5. As compared with the power reception device 3 shown in FIG. 1, a power reception device 4 according to this modified example is different in that a Zener diode 41 is provided between an output terminal on a positive electrode side of a second rectifier circuit 26 and a smoothing capacitor 24. Therefore, the Zener diode 41 and related parts will be described below. For other components of the power reception device 4, refer to the description of the corresponding components in the above embodiment.

The Zener diode 41 has a cathode terminal connected to the output terminal on the positive electrode side of the second rectifier circuit 26, and an anode terminal connected to the smoothing capacitor 24, so as to be reversely biased with respect to an output voltage from the second rectifier circuit 26. As a result, only when a voltage that corresponds to a voltage generated in a sub-coil 25 and is outputted from the second rectifier circuit 26 is larger than a value obtained by adding a breakdown voltage of the Zener diode 41 to a voltage between both terminals of the smoothing capacitor 24, a current flows from the sub-coil 25 to the smoothing capacitor 24 via the second rectifier circuit 26 and the Zener diode 41. Therefore, the voltage that is generated in the sub-coil 25 and enables a current to flow from the sub-coil 25 to the smoothing capacitor 24 can be made higher than that in the case without the Zener diode 41. As a result, even if the number of turns $n_s$ of the sub-coil 25 is relatively large, a current is prevented from flowing from the sub-coil 25 to the smoothing capacitor 24 when the non-contact power feeding device 1 is performing the constant voltage output operation. Therefore, according to this modified example, the non-contact power feeding device can appropriately protect the resonant circuit 20 from overvoltage while suppressing a decrease in power transmission efficiency, even when the number of turns of the reception coil 21 is relatively small.

Note that, in the modified example shown in FIG. 5, instead of the Zener diode 41, two Zener diodes may be connected between one end of the sub-coil 25 and one input terminal of the second rectifier circuit 26 so as to be reversely biased with respect to a voltage generated in the sub-coil 25. In this case, in the two Zener diodes, it suffices that anode terminals of both are connected to each other, a cathode terminal of one of the Zener diodes is connected to one end of the sub-coil 25, and a cathode terminal of another one of the Zener diodes is connected to one input terminal of the second rectifier circuit 26. In this case as well, an effect similar to that of the modified example shown in FIG. 5 can be obtained.

Further, according to another modified example, by switching between short-circuiting and opening of the sub-coil 25 in accordance with an output voltage from the smoothing capacitor 24, the power reception device and the load circuit 27 may be protected by suppressing an excessive increase in a voltage according to a change in a coupling degree between the transmission coil 14 and the reception coil 21.

Figure 6:
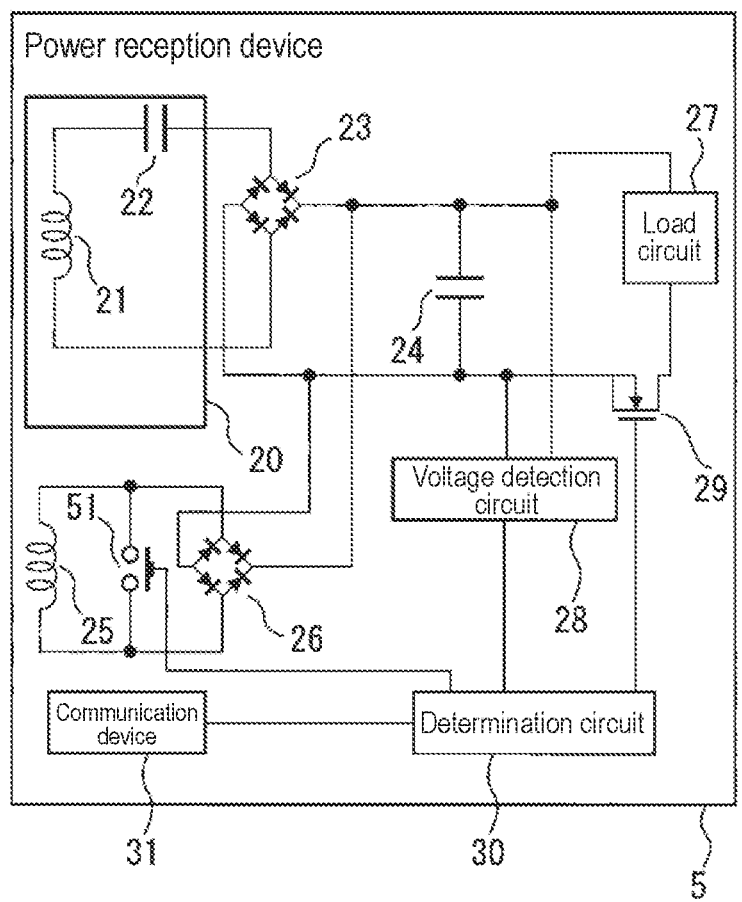
FIG. 6 is a schematic configuration diagram illustrating a power reception device according to another modified example.

FIG. 6 is a schematic configuration diagram of a power reception device according to another modified example. As compared with the power reception device 3 shown in FIG. 1, a power reception device 5 according to this modified example is different in that a switch circuit 51 configured to switch between short-circuiting and opening of a sub-coil 25 is provided, and a determination circuit 30 controls on/off switching of the switch circuit 51. Therefore, the switch circuit 51 and related parts will be described below. For other components of the power reception device 5, refer to the description of the corresponding components in the above embodiment.

The switch circuit 51 has, for example, a relay or a MOSFET. One end of the switch circuit 51 is connected between one end of the sub-coil 25 and one terminal on an input side of a second rectifier circuit 26, and another end of the switch circuit 51 is connected between another end of the sub-coil 25 and another terminal on the input side of the second rectifier circuit 26.

The determination circuit 30 compares a measured value of an output voltage obtained by a voltage detection circuit 28 with an upper-limit threshold value (a first upper-limit threshold value), and switches on/off of the switch circuit 51 in accordance with a result. That is, the determination circuit 30 turns on the switch circuit 51 to short-circuit the sub-coil 25 when the measured value of the output voltage becomes equal to or larger than the upper-limit threshold value. Whereas, the determination circuit 30 turns off the switch circuit 51 to open the sub-coil 25 when the measured value of the output voltage becomes less than the upper-limit threshold value. Note that the upper-limit threshold value is preferably set to a value larger than a voltage applied to a load circuit 27 when the non-contact power feeding device performs the constant voltage output operation, particularly a value equal to or larger than an upper limit value of an allowable range. Note that the determination circuit 30 may notify a communication device 16 of a power transmission device 2 via a communication device 31 that the measured value of the output voltage has become equal to or larger than the upper-limit threshold value. In this case as well, when a control circuit 18 of the power transmission device 2 is notified by the communication device 16 that the measured value of the output voltage has become equal to or larger than the upper-limit threshold value, the control circuit 18 may control a switching frequency and electric power of AC power supplied from the power supply circuit 10 to a transmission coil 14 similarly to when the constant voltage output operation is maintained.

When the switch circuit 51 is turned on and the sub-coil 25 is short-circuited, a resonance frequency of the resonant circuit 20 changes. Therefore, even if the output voltage from the resonant circuit 20 rises excessively, electric power transmitted from the power transmission device 2 to a power reception device 3 is reduced by the sub-coil 25 being short-circuited, so that the output voltage from the resonant circuit 20 is also reduced. Therefore, according to this modified example, the non-contact power feeding device can suppress an increase in a voltage applied to a reception coil 21 according to a fluctuation of a coupling degree between the transmission coil 14 and the reception coil 21. Therefore, this non-contact power feeding device can prevent an output voltage from the resonant circuit from excessively rising and causing a failure of the power reception device or the load circuit.

According to still another modified example, in addition to the switch circuit 51 configured to short-circuit the sub-coil 25, there may be provided a switch circuit configured to short-circuit a resonant circuit 20 in accordance with a measured value of an output voltage obtained by a voltage detection circuit 28.

Figure 7:
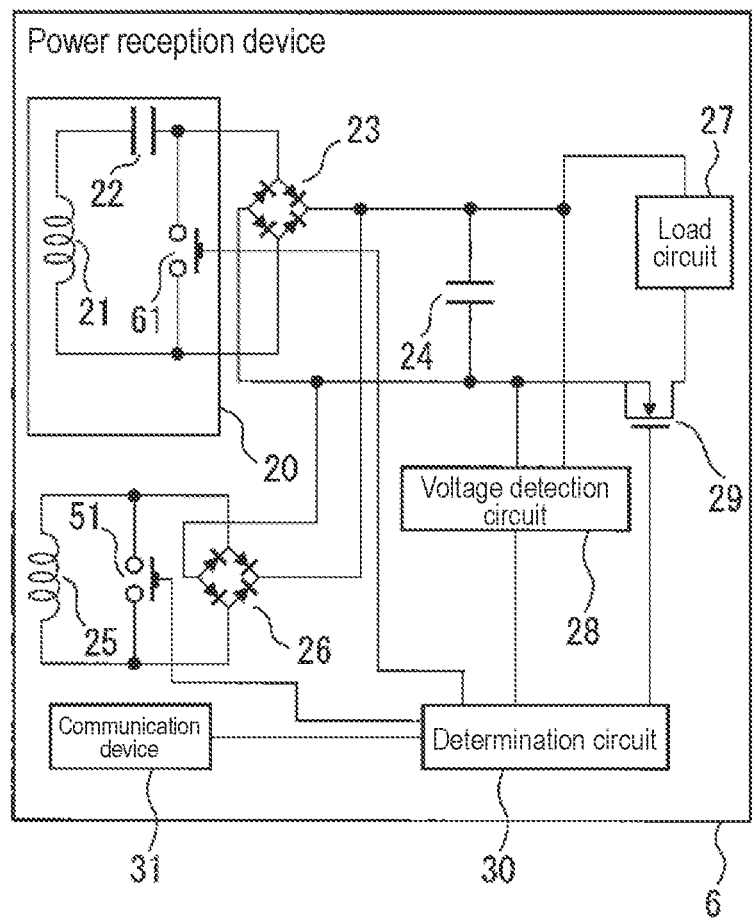
FIG. 7 is a schematic configuration diagram illustrating a power reception device according to still another modified example.

FIG. 7 is a schematic configuration diagram of a power reception device according to still another modified example. As compared with the power reception device 5 shown in FIG. 6, a power reception device 6 according to this modified example is different in that a switch circuit 61 configured to switch between short-circuiting and opening of the resonant circuit 20 is provided, and a determination circuit 30 controls on/off switching of the switch circuit 61. Therefore, the switch circuit 61 and related parts will be described below. For other components of the power reception device 6, refer to the description of the corresponding components in the above embodiment or modified example.

The switch circuit 61 has, for example, a relay or a MOSFET. One end of the switch circuit 61 is connected between one end of a resonant capacitor 22 and one terminal on an input side of a first rectifier circuit 23, and another end of the switch circuit 61 is connected between one end of a reception coil 21 opposite to the resonant capacitor 22 and another terminal on the input side of the first rectifier circuit 23.

The determination circuit 30 compares a measured value of an output voltage obtained by the voltage detection circuit 28 with a second upper-limit threshold value, and switches on/off of the switch circuit 61 in accordance with a result. That is, when the measured value of the output voltage becomes equal to or larger than the second upper-limit threshold value, the determination circuit 30 turns on the switch circuit 61 to short-circuit the resonant circuit 20. Whereas, the determination circuit 30 turns on the switch circuit 61 to open the resonant circuit 20 when the measured value of the output voltage becomes less than the second upper-limit threshold value. Note that the second upper-limit threshold value is preferably set to a value higher than the upper-limit threshold value used for determination of switching on/off of the switch circuit 51. This causes short-circuit of the sub-coil 25 before the resonant circuit 20 is short-circuited, so that an excessive short-circuit current is prevented from flowing to the resonant circuit 20.

When the switch circuit 61 is turned on to short-circuit the resonant circuit 20, the output voltage also drops. Therefore, in this modified example as well, the non-contact power feeding device can suppress an increase in a voltage applied to the reception coil 21 according to a fluctuation of a coupling degree between the transmission coil 14 and the reception coil 21. Accordingly, this non-contact power feeding device can prevent an output voltage from the resonant circuit from excessively rising and causing a failure of the power reception device or the load circuit. In addition, even when an output voltage from the smoothing capacitor 24 cannot be lowered to a target voltage (for example, an output voltage from the smoothing capacitor 24 during the constant voltage output operation) by simply short-circuiting the sub-coil 25, as in a case where a ratio of the number of turns of the reception coil 21 to the number of turns of the sub-coil 25 is large and a load resistance by the load circuit 27 is large, the non-contact power feeding device according to this modified example can lower the output voltage from the smoothing capacitor 24 to the target voltage.

According to yet another modified example, the sub-coil 25 may be connected to a saturable reactor.

Figure 8:
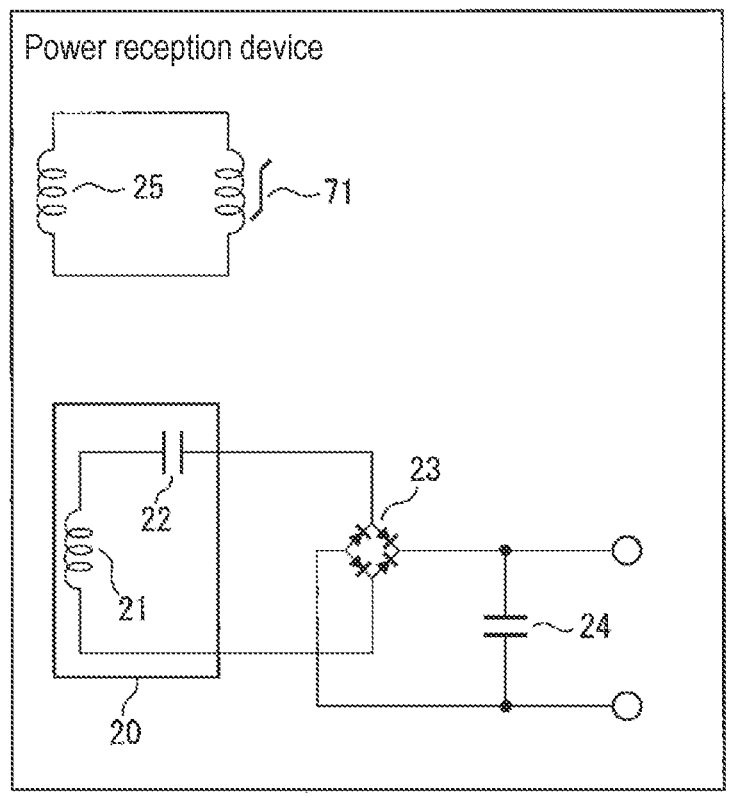
FIG. 8 is a schematic configuration diagram illustrating a power reception device according to yet another modified example.

FIG. 8 is a schematic configuration diagram of a power reception device according to this modified example. Note that, for the sake of simplicity, a load circuit 27, a voltage detection circuit 28, a switching element 29, a determination circuit 30, and a communication device 31 are not illustrated in FIG. 8. As compared with the power reception device 3 shown in FIG. 1, a power reception device 7 according to this modified example is different in that a saturable reactor 71 is provided instead of the second rectifier circuit 26, and a sub-coil 25 and a smoothing capacitor 24 are not connected. Therefore, the saturable reactor 71 and related parts will be described below. For other components of the power reception device 7, refer to the description of the corresponding components in the above embodiment.

In this modified example, one end of the saturable reactor 71 is connected to one end of the sub-coil 25, and another end of the saturable reactor 71 is connected to another end of the sub-coil 25. Then, in this modified example, when a voltage applied to a reception coil 21 is increased to a certain level or more, to also increase a voltage generated in the sub-coil 25 to exceed a voltage value at which the saturable reactor 71 is saturated, an inductance of the saturable reactor 71 decreases and the sub-coil 25 is short-circuited. As a result, a resonance frequency of a resonant circuit 20 changes, which lowers a voltage applied to the reception coil 21 as well.

Therefore, even in this modified example, the non-contact power feeding device can prevent an excessive voltage from being applied to the resonant circuit of the power reception device, without controlling AC power supplied to the transmission coil on the power transmission side.

Note that, in the above embodiment or each modified example, a power supply circuit configured to supply AC power to the transmission coil 14 in the power transmission device 2 may have a circuit configuration different from that of the above embodiment, as long as the circuit can variably adjust a switching frequency and a voltage applied to the transmission coil 14.

Further, the non-contact power feeding device according to the above embodiment or each modified example may be operated in accordance with the SS system. That is, the resonant circuit including the transmission coil 14 and the capacitor 15 of the power transmission device 2 may have an inductance of the transmission coil 14 and a capacitance of the capacitor 15 set so as to resonate at any frequency within an adjustment range of the switching frequency of AC power supplied from the power supply circuit to the transmission coil 14.

Further, in the above embodiment or each modified example, when it is possible to connect the communication device of the power transmission device with the communication device of the power reception device by wire, each communication device is only required to have a communication circuit configured to transmit a signal including determination information by wire.

Further, in the above embodiment or in the modified example shown in FIG. 5 or FIG. 8, in a case where the power transmission device and the power reception device are arranged such that a coupling degree between the transmission coil 14 and the reception coil 21 is constant while the non-contact power feeding device is performing power transmission, it is possible to omit the communication device 16 of the power transmission device 2, and the voltage detection circuit 28, the switching element 29, the determination circuit 30, and the communication device 31 of the power reception device. In this case, the control circuit 18 of the power transmission device 2 is only required to control the power supply circuit 10 to supply AC power having a switching frequency and a voltage according to the coupling degree between the transmission coil 14 and the reception coil 21 to the transmission coil 14 such that a voltage outputted from the smoothing capacitor 24 of the power reception device to the load circuit 27 becomes a predetermined voltage. In this way, the non-contact power feeding device can prevent an excessive voltage from being applied to the resonant circuit even if communication is not performed between the power transmission device 2 and the power reception device 3.

As described above, those skilled in the art can make various changes within the scope of the present invention according to the embodiment.

DESCRIPTION OF SYMBOLS 1 non-contact power feeding device
2 power transmission device
10 power supply circuit
11 power source
12 power-factor improving circuit
13-1 to 13-4 switching element
14 transmission coil
15 capacitor
16 communication device 17-1, 17-2 gate driver
18 control circuit
3 to 7 power reception device
20 resonant circuit
21 reception coil
22 resonant capacitor
23 first rectifier circuit
24 smoothing capacitor
25 sub-coil
26 second rectifier circuit
27 load circuit
28 voltage detection circuit
29 switching element
30 determination circuit
31 communication device
41 Zener diode
51, 61 switch circuit
71 saturable reactor

The invention claimed is:

1. A non-contact power feeding device comprising a power transmission device and a power reception device to which electric power is transmitted from the power transmission device in a non-contact manner, wherein
the power transmission device comprises:
　a transmission coil configured to supply electric power to the power reception device; and
　a power supply circuit configured to supply alternating current power to the transmission coil, and
the power reception device comprises:
　a resonant circuit comprising a reception coil configured to receive electric power from the power transmission device, and a resonant capacitor connected in series with the reception coil;
　a first rectifier circuit configured to rectify electric power received via the resonant circuit;
　a smoothing capacitor connected to the first rectifier circuit and configured to smooth a voltage outputted from the first rectifier circuit;
　a sub-coil arranged to be electromagnetically coupled to the reception coil;
　a second rectifier circuit connected between the sub-coil and the smoothing capacitor, and configured to output electric power according to a voltage generated in the sub-coil to the smoothing capacitor, in response to a first voltage obtained by rectifying a voltage generated in the sub-coil being higher than a voltage between both terminals of the smoothing capacitor;
　a first switch circuit connected to the sub-coil and configured to switch between short-circuiting and opening of both ends of the sub-coil;
　a voltage detection circuit configured to measure an output voltage from the smoothing capacitor to obtain a measured value of the output voltage; and
　a determination circuit configured to control the first switch circuit to short-circuit the both ends of the sub-coil in response to a measured value of the output voltage being equal to or larger than a first upper-limit threshold value, and wherein
the power reception device further comprises a second switch circuit comprising a first end connected between the resonant capacitor and the first rectifier circuit, and a second end connected to a terminal of the reception coil on a side where the resonant capacitor is not connected, the second switch circuit being configured to switch between short-circuiting and opening of the resonant circuit, and
the determination circuit controls the second switch circuit to short-circuit the resonance circuit in response to a measured value of the output voltage being equal to or greater than a second upper-limit threshold value that is greater than the first upper-limit threshold value.

\* \* \* \* \*